No. 749,073. Patented January 5, 1904.

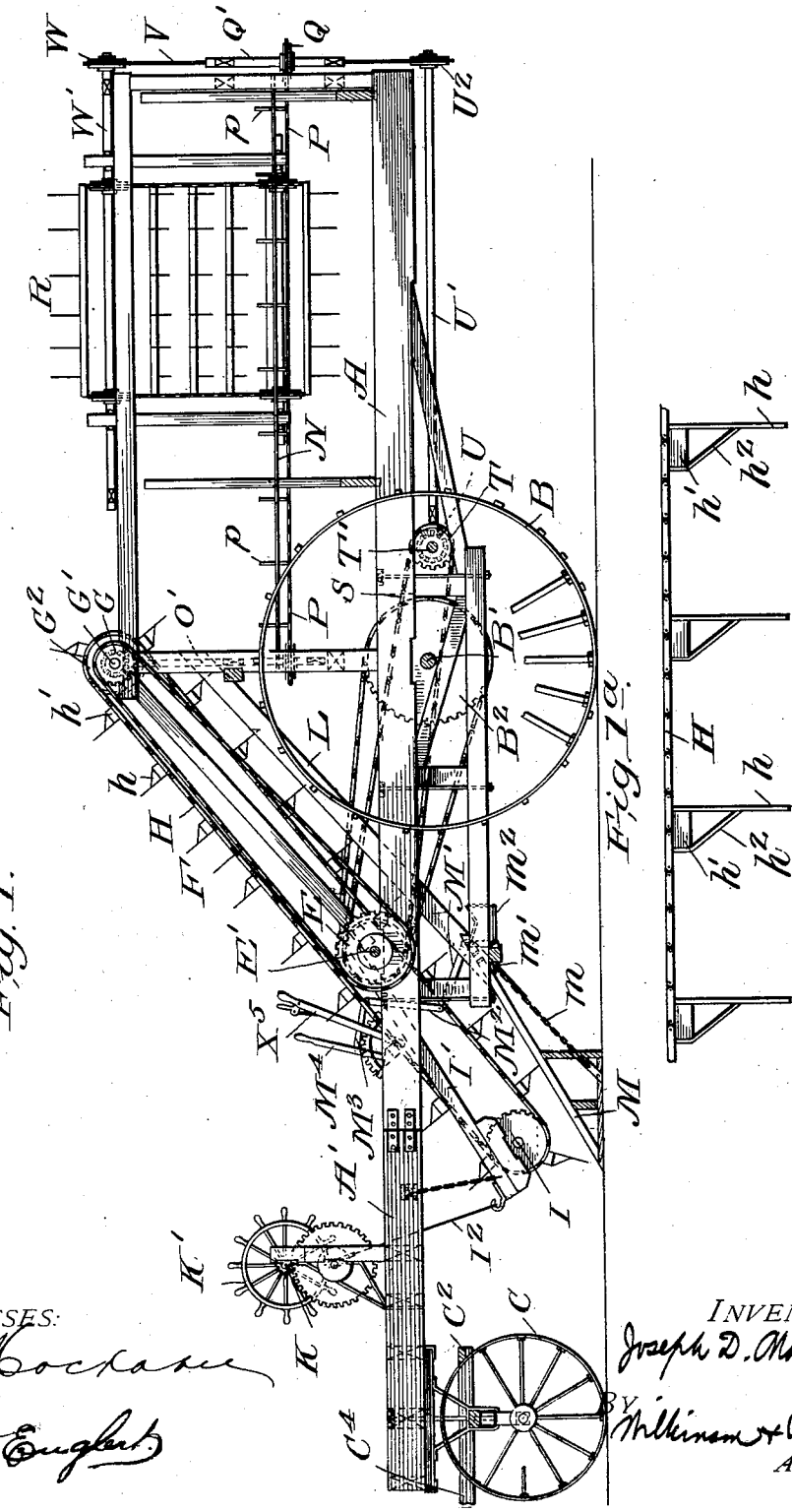

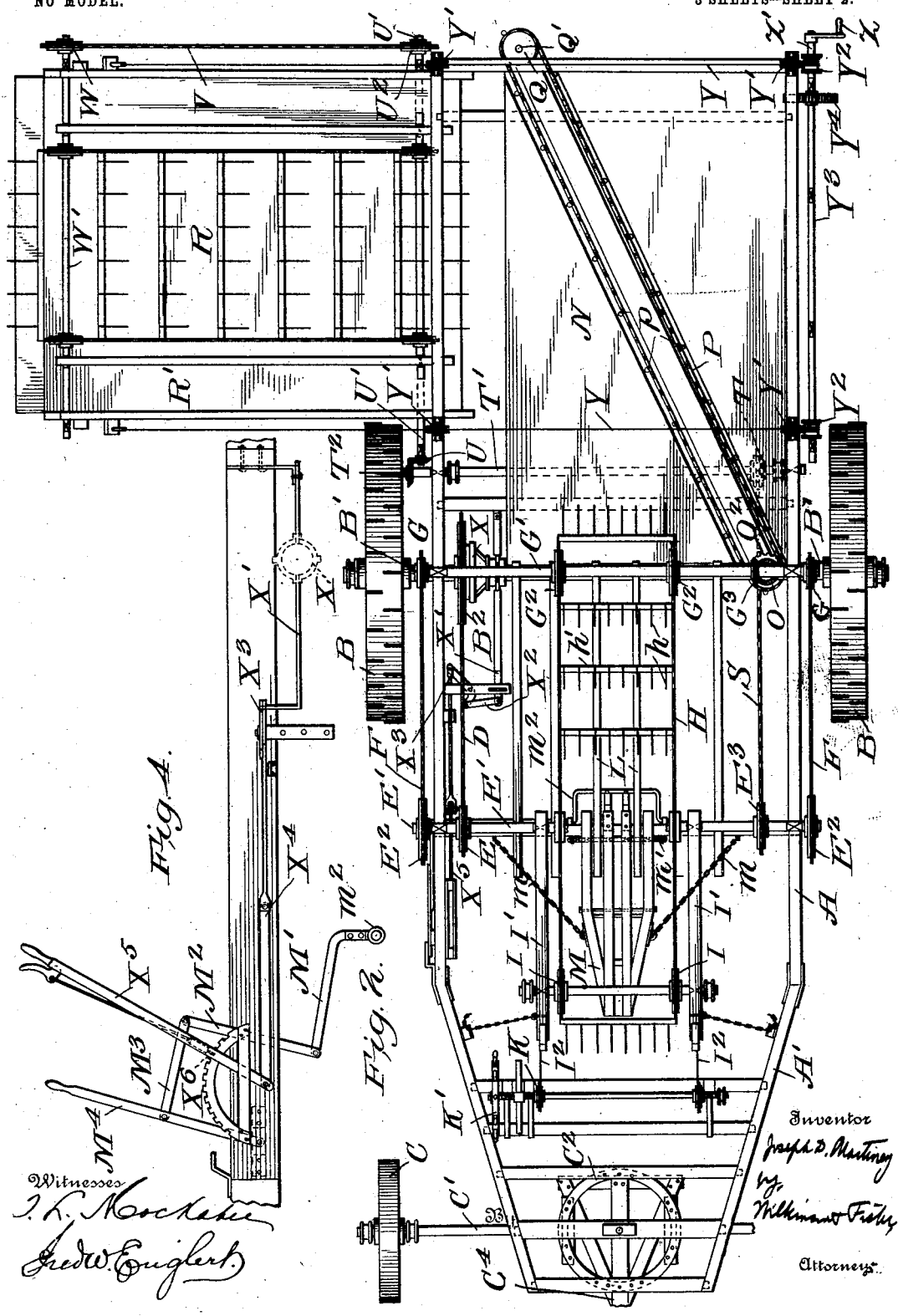

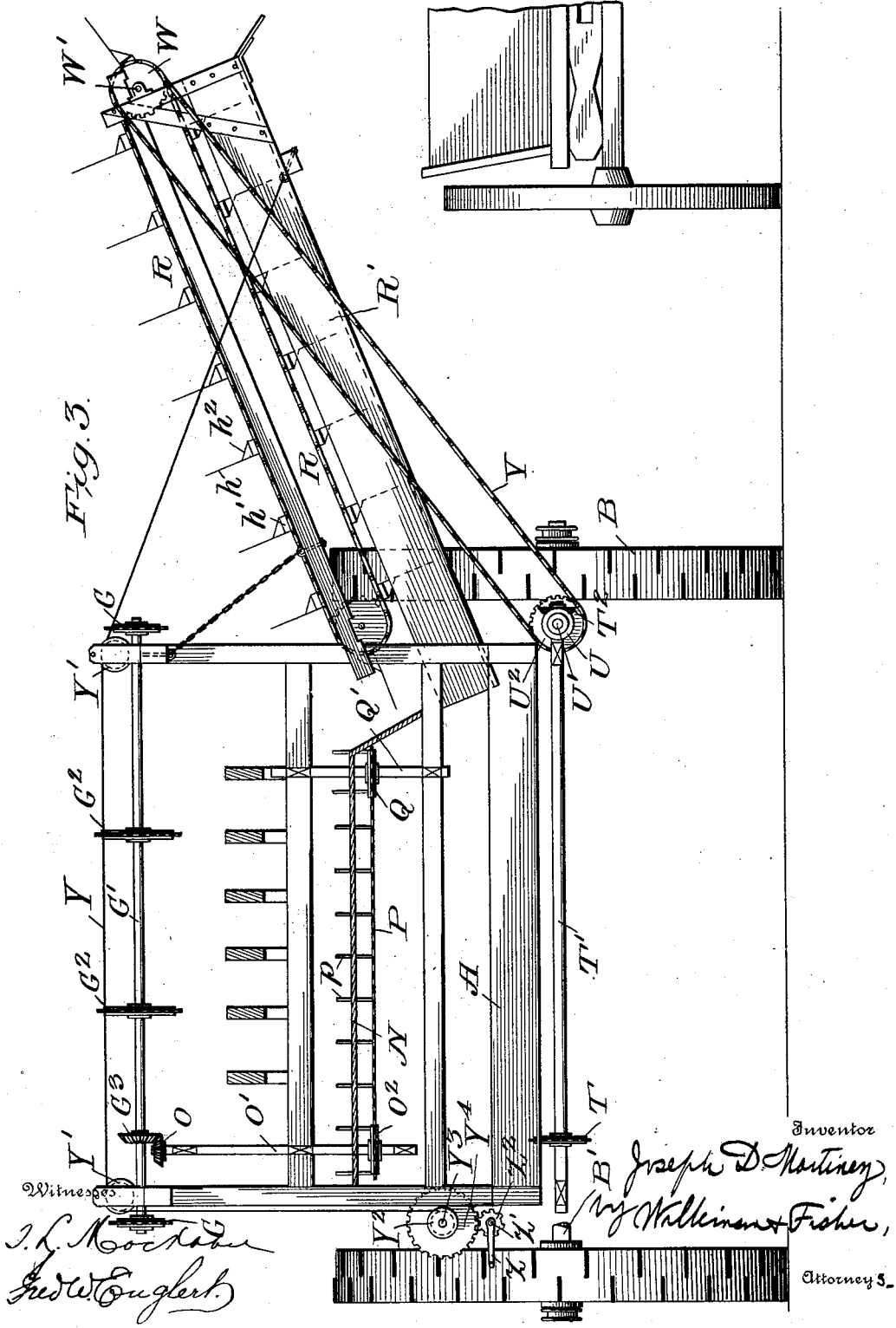

UNITED STATES PATENT OFFICE.

JOSEPH D. MARTINEZ, OF WHITECASTLE, LOUISIANA.

CANE-LOADER.

SPECIFICATION forming part of Letters Patent No. 749,073, dated January 5, 1904.

Application filed September 17, 1903. Serial No. 173,582. (No model.)

*To all whom it may concern:*

Be it known that I, JOSEPH D. MARTINEZ, a citizen of the United States, residing at Whitecastle, in the parish of Iberville and State of Louisiana, have invented certain new and useful Improvements in Cane-Loaders; and I do hereby declare the following to be a full, clear, and exact description of the invention, such as will enable others skilled in the art to which it appertains to make and use the same.

My present invention relates to improvements in cane-loading machines; and it consists of the machine provided with appliances for picking up, elevating, and turning the cane into position for loading upon a cart, car, or other vehicle, and finally for dropping it upon such vehicle, as will be hereinafter fully described and claimed.

Reference is had to the accompanying drawings, in which the same parts are indicated by the same letters of reference throughout the several views.

Figure 1 is a side elevation of the machine, parts being broken away. Fig. 1$^a$ is a detail showing part of one of the conveyers. Fig. 2 is a plan view of the machine, parts being omitted for the sake of clearness in the drawings. Fig. 3 is a rear view, partly in section, of the machine, showing the vehicle and a cart alongside; and Fig. 4 is a detail showing the levers for lifting the shoe and for throwing the clutch into and out of engagement.

A represents the frame of the machine, which is narrow at its forward part, as at A'. This frame is mounted on the wheels B and C, the wheels C being mounted on the axle C', which has the usual fifth-wheel C$^2$. The machine may be drawn by a team hitched to the pole C$^4$ or a motor-engine may be used, if desired.

The traction-wheels B are mounted fast on the shaft B', which shaft carries the sprocket-wheel B$^2$, thrown in and out of engagement by the clutch mechanism X, as will be hereinafter described. This sprocket-wheel B$^2$ is connected to the sprocket E on the shaft E' by the chain D. This shaft E' carries at each end a sprocket-wheel E$^2$ and also carries a sprocket-wheel E$^3$. The chain F connects the sprocket-wheels E$^2$ with the sprocket-wheels G on the shaft G', which shaft carries the sprocket-wheels G$^2$, meshing with the chains H of the hoisting-carrier. Spanning these chains are the cross-pieces $h'$, to which the pushers $h$ are connected. The construction of pusher is preferably that shown in Fig. 1$^a$, in which the pusher-blade $h$ is braced by the inclined brace $h^2$, and the two are fastened to the cross-piece $h'$. These cross-pieces slide along over the beams L, which form a skeleton bottom for the carrier and allow the dirt, trash, &c., to drop through, but not the cane-stalks. In Fig. 2 a number of these cross-pieces are omitted to better illustrate the parts beneath. The lower end of this carrier carries a pivoted frame I', in which the idler I is journaled, which frame may be raised or lowered by means of the wire rope or chain I$^2$ and the winch K, which is operated by the hand-wheel K'.

M represents an adjustable shoe, which is tapered, as shown in Figs. 1 and 2, so as to project down between the cane-rows. This shoe is braced laterally by the chains $m$ and is pivoted, as at $m'$, having fast to the rear end thereof the crank-bar $m^2$, which crank-bar is moved about its pivot by means of the connecting-rods M' M$^2$ M$^3$ and the lever M$^4$. (Shown in detail in Fig. 4.) Thus the point of the shoe may be raised or lowered to avoid obstructions or inequalities in the surface of the ground. The shoe is in the form of a slatted frame, so that the dirt and trash may drop through. The cane is dragged up the shoe and along the beams L by the hoisting-carrier and falls on the platform N. Diagonally beneath this platform travels the endless chain P, which carries pusher-pins $p$, which project through diagonal slots in the platform N and, engaging the ends of the cane-stalks, turn the same laterally through a right angle until they become parallel to the cross-pieces of the delivery-carrier R.

The chain P is driven by means of the sprocket-wheel O$^2$ on the shaft O', which shaft carries the bevel-gear O, meshing with the bevel-gear G$^3$ on the shaft G'.

The opposite bight of the chain P passes over the idler Q on the shaft Q'. The delivery-carrier R is provided with a chute R', along which the cane is pushed by pushers similar to those already described with regard to the hoisting-carrier. This carrier R is driven as follows: The chain S (see Fig. 2) is driven by the sprocket-wheel $E^3$ on the shaft $E'$ and turns the sprocket-wheel T on the shaft $T'$, which shaft carries the bevel-gear $T^2$, meshing with the bevel-gear U on the shaft $U'$. This shaft carries the sprocket-wheel $U^2$, which is connected by the chain V to the sprocket-wheel W on the shaft $W'$, which shaft drives the carrier R. The chute $R'$ is raised or lowered by means of the ropes or chains Y, which pass over the idler $Y'$, that leads down to the drums $Y^2$ on the shaft $Y^3$, (see Fig. 3,) which shaft carries a spur-wheel $Y^4$, which is turned by means of the hand-crank Z, mounted on the same shaft $Z'$ with the gear $Z^2$.

Thus it will be seen that the hoisting-carrier, the turning device, and the delivery-carrier are all operated by means of the chain D, which is driven by the traction-wheels through the interposition of the clutch X. This clutch may be thrown into or out of engagement by means of the rods $X'$ $X^2$, the lever $X^3$, the rod $X^4$, and the lever $X^5$, which is provided with a spring-pawl engaging in the rack $X^6$, as shown in Fig. 4.

Any suitable form of clutch mechanism may be adopted, if desired.

The operation of the device is as follows: The cane is first cut in the usual way and laid across the depression between two rows, the ends of the cane being supported by the elevated rows, two out of every three furrows being left bare, so that the loading-machine may travel along without driving over the cut cane. The machine is so placed that the shoe M projects into the furrow beneath the cane-stalks, and the machine is drawn ahead, while at the same time the clutch X is thrown into operation, causing the various operative parts to be driven by the traction-wheels B, as before described. The cane-stalks are dragged by means of the hoisting-carrier above the shoe M and up the incline L and are dumped on the platform N. Here the stalks are turned laterally through ninety degrees by means of the inclined drag-chain P, with the pins $p$, and is pushed off the platform N, falling on the carrier R. From this delivery-carrier it is dumped in the cart or other vehicle, as indicated in Fig. 3. Thus it will be seen that the machine picks up the cane while moving in a fore-and-aft direction, swings the cane laterally through ninety degrees, and delivers it from the broad side of the machine to a suitable vehicle which is propelled alongside of the machine. By having the shoe and the incline L with skeleton bottoms most of the dirt and much of the trash that were picked up with the cane will fall through to the ground, while the stalks will be carried upward and delivered to the cart, as has already been described.

It will be obvious that various modifications might be made in the herein-described apparatus which could be used without departing from the spirit of my invention.

Having thus described my invention, what I claim, and desire to secure by Letters Patent of the United States, is—

1. A cane-hoisting apparatus, comprising a frame, traction-wheels journaled beneath said frame, a pivoted shoe, an incline above said shoe, an endless drag mounted above said shoe and incline and driven by said traction-wheels, a platform receiving the cane from said drag, means for swinging the cane-stalks laterally through a right angle on said platform and for pushing the cane off of said platform, and a delivery-carrier for delivering the cane from said platform, substantially as described.

2. A cane-hoisting apparatus, comprising a frame, traction-wheels journaled beneath said frame, a pivoted shoe made of slats spaced apart, inclined beams spaced apart mounted above said shoe, an endless drag mounted above said shoe and incline and driven by said traction-wheels, a platform receiving the cane from said drag, means for swinging the cane-stalks laterally through a right angle on said platform and for pushing the cane off of said platform, and a delivery-carrier for delivering the cane from said platform, substantially as described.

3. A cane-hoisting apparatus, comprising a frame, traction-wheels journaled beneath said frame, a pivoted shoe, an incline above said shoe, an endless drag mounted above said shoe and incline and driven by said traction-wheels, a diagonally-slotted platform receiving the cane from said drag, an endless chain having pusher-pins projecting through said diagonal slot for swinging the cane-stalks laterally through a right angle on said platform and for pushing the cane off of said platform, and a delivery-carrier for delivering the cane from said platform, substantially as described.

4. A cane-hoisting apparatus, comprising a frame, traction-wheels journaled beneath said frame, a pivoted shoe, means for raising and lowering said shoe, an incline above said shoe, an endless drag mounted above said shoe and incline and driven by said traction-wheels, means for raising and lowering the lower end of said drag, a platform receiving the cane from said drag, means for swinging the cane-stalks laterally through a right angle on said platform and for pushing the cane off of said platform, and a delivery-carrier for delivering the cane from said platform, substantially as described.

5. A cane-hoisting apparatus, comprising a frame, traction-wheels journaled beneath said frame, a pivoted shoe, means for raising and lowering said shoe, an incline above said shoe, an endless drag mounted above said shoe and incline and driven by said traction-wheels, means for raising and lowering the lower end of said drag, a platform receiving the cane from said drag, means for swinging the cane-stalks laterally through a right angle on said platform and for pushing the cane off of said platform, and a delivery-carrier for delivering the cane from said platform, with means for raising and lowering the free end of said carrier, substantially as described.

6. A cane-hoisting apparatus, comprising a frame, traction-wheels journaled beneath said frame, an endless drag driven by said traction-wheels, a diagonally-slotted platform receiving the cane from said drag, a chain carrying pins projecting through the diagonal slot in the platform for swinging the cane-stalks laterally through a right angle on said platform and for pushing the cane off of said platform, and a delivery-carrier for delivering the cane from said platform, substantially as described.

7. A cane-hoisting apparatus, comprising a frame, traction-wheels journaled beneath said frame, a pivoted shoe, with means for raising and lowering the free end of said shoe, an incline above said shoe, an endless drag mounted above said shoe and incline and driven by said traction-wheels, means for raising and lowering the free end of said drag, a platform receiving the cane from said drag, means for swinging the cane-stalks laterally through a right angle on said platform and for pushing the cane off of said platform, and a delivery-carrier for delivering the cane from said platform, substantially as described.

8. A cane-hoisting apparatus, comprising a frame, traction-wheels journaled beneath said frame, a pivoted shoe made of slats spaced apart, inclined beams spaced apart mounted above said shoe, an endless drag mounted above said shoe and incline and driven by said traction-wheels, a platform receiving the cane from said drag, means for swinging the cane-stalks laterally through a right angle on said platform and for pushing the cane off of said platform, a pivoted delivery-carrier for delivering the cane from said platform, and means for raising and lowering the free end of said carrier, substantially as described.

9. A cane-hoisting apparatus, comprising a frame, traction-wheels journaled beneath said frame, a tapered shoe, means for raising and lowering the point of said shoe, an incline above said shoe, an endless drag mounted above said shoe and incline and driven by said traction-wheels, a diagonally-slotted platform receiving the cane from said drag, an endless chain having pusher-pins projecting through said diagonal slot for swinging the cane-stalks laterally through a right angle on said platform and for pushing the cane off of said platform, a delivery-carrier for delivering the cane from said platform, and means for raising and lowering the free end of said carrier, substantially as described.

10. A cane-hoisting apparatus, comprising a frame, traction-wheels journaled beneath said frame, a tapered shoe, means for raising and lowering said shoe, an incline above said shoe, an endless drag mounted above said shoe and incline and driven by said traction-wheels, means for raising and lowering the lower end of said drag, a platform receiving the cane from said drag, means for swinging the cane-stalks laterally through a right angle on said platform and for pushing the cane off of said platform, a delivery-carrier for delivering the cane from said platform, and means for raising and lowering the free end of said carrier, substantially as described.

11. A cane-hoisting apparatus, comprising a frame, traction-wheels journaled beneath said frame, a pivoted shoe, means for raising and lowering said shoe, an incline above said shoe, an endless drag mounted above said shoe and incline and driven by said traction-wheels, a winch and ropes for raising and lowering the lower end of said drag, a platform receiving the cane from said drag, means for swinging the cane-stalks laterally through a right angle on said platform and for pushing the cane off of said platform, and a delivery-carrier for delivering the cane from said platform, with a winch and ropes for raising and lowering the free end of said carrier, substantially as described.

12. A cane-hoisting apparatus, comprising a frame, traction-wheels journaled beneath said frame, a hoisting-carrier driven by said traction-wheels, a diagonally-slotted platform receiving the cane from said carrier, a chain carrying pins projecting through the diagonal slot in the platform for swinging the cane-stalks laterally through a right angle on said platform and for pushing the cane off of said platform, mechanism operated by said traction-wheels for driving said chain, and a delivery-carrier also driven by said traction-wheels for delivering the cane from said platform, substantially as described.

13. A cane-hoisting apparatus, comprising a frame, traction-wheels journaled beneath said frame, a pivoted shoe, inclined beams spaced apart mounted above said shoe, an endless drag mounted above said shoe and beams and provided with pusher-arms projecting between said beams, a platform receiving the cane from said drag, means for swinging the cane-stalks laterally through a right angle on said platform and for pushing the cane off of said platform, and a delivery-carrier for delivering the cane from said platform, substantially as described.

14. A cane-hoisting apparatus, comprising a frame, traction-wheels journaled beneath said frame, a pivoted shoe, inclined beams spaced apart mounted above said shoe, an endless drag mounted above said shoe and beams and provided with pusher-arms projecting between said beams, a diagonally-slotted platform receiving the cane from said drag, an endless chain having pusher-pins projecting through said diagonal slot for swinging the cane-stalks laterally through a right angle on said platform and for pushing the cane off of said platform, and a delivery- 15. A cane-hoisting apparatus, comprising a frame, traction-wheels journaled beneath said frame, a pivoted shoe, inclined beams spaced apart mounted above said shoe, and an endless drag mounted above said shoe and beams and provided with pusher-arms projecting between said beams, means for raising and lowering the lower end of said drag, a platform receiving the cane from said drag, means for swinging the cane-stalks laterally through a right angle on said platform and for pushing the cane off of said platform, and a delivery-carrier for delivering the cane from said platform, substantially as described.

16. A cane-hoisting apparatus, comprising a frame, traction-wheels journaled beneath said frame, a pivoted shoe, inclined beams spaced apart mounted above said shoe, an endless drag mounted above said shoe and beams and provided with pusher-arms projecting between said beams, means for raising and lowering the lower end of said drag, a platform receiving the cane from said drag, means for swinging the cane-stalks laterally through a right angle on said platform and for pushing the cane off of said platform, and a delivery-carrier for delivering the cane from said platform, with means for raising and lowering the free end of said carrier, substantially as described.

17. A cane-hoisting apparatus, comprising a frame, traction-wheels journaled beneath said frame, a pivoted shoe, inclined beams spaced apart mounted above said shoe, an endless drag mounted above said shoe and beams and provided with pusher-arms projecting between said beams, a diagonally-slotted platform receiving the cane from said drag, a chain carrying pins projecting through the diagonal slot in the platform for swinging the cane-stalks laterally through a right angle on said platform and for pushing the cane off of said platform, a pivoted delivery-carrier for delivering the cane from said platform, and means for raising and lowering the free end of said carrier, substantially as described.

18. A cane-hoisting apparatus, comprising a frame, traction-wheels journaled beneath said frame, a hoisting-carrier, a platform receiving the cane from said carrier, a device for swinging the cane-stalks laterally through a right angle on said platform and for pushing the cane off of said platform, a delivery-carrier for delivering the cane from said platform, with mechanism operated by said traction-wheels for moving said carriers and said cane-turning device, with a clutch for throwing said mechanism into and out of action when desired, substantially as described.

19. A cane-hoisting apparatus, comprising a frame, traction-wheels journaled beneath said frame, a pivoted shoe, inclined beams above said shoe, a hoisting-carrier mounted above said shoe and beams, a diagonally-slotted platform receiving the cane from said carrier, an endless chain having pusher-pins projecting through said diagonal slot for swinging the cane-stalks laterally through a right angle on said platform and for pushing the cane off of said platform, a delivery-carrier for delivering the cane from said platform, with mechanism operated by said traction-wheels for moving said carriers and said cane-turning device, with a clutch for throwing said mechanism into and out of action when desired, substantially as described.

20. A cane-hoisting apparatus, comprising a frame, traction-wheels journaled beneath said frame, a pivoted shoe, means for raising and lowering said shoe, inclined beams above said shoe, a hoisting-carrier mounted above said shoe and beams, means for raising and lowering the lower end of said carrier, a platform receiving the cane from said drag, means for swinging the cane-stalks laterally through a right angle on said platform and for pushing the cane off of said platform, a delivery-carrier for delivering the cane from said platform, with means for raising and lowering the free end of said carrier, with mechanism operated by said traction-wheels for moving said carriers and said cane-turning device, with a clutch for throwing said mechanism into and out of action when desired, substantially as described.

21. A cane-hoisting apparatus, comprising a frame, traction-wheels journaled beneath said frame, a hoisting-carrier, a diagonally-slotted platform receiving the cane from said carrier, a chain carrying pins projecting through the diagonal slot in the platform for swinging the cane-stalks laterally through a right angle on said platform and for pushing the cane off of said platform, a delivery-carrier for delivering the cane from said platform, with mechanism operated by said traction-wheels for moving said carriers and said cane-turning device, with a clutch for throwing said mechanism into and out of action when desired, substantially as described.

In testimony whereof I affix my signature in presence of two witnesses.

JOSEPH D. MARTINEZ.

Witnesses:
ROBT. A. YOUNGS,
WM. WALKER.